United States Patent [19]

Bellan

[11] Patent Number: 5,387,926
[45] Date of Patent: Feb. 7, 1995

[54] HIGH SPEED DIGITAL FRAMING CAMERA

[75] Inventor: Paul M. Bellan, Pasadena, Calif.

[73] Assignee: California Institute of Technology, Pasadena, Calif.

[21] Appl. No.: 906,898

[22] Filed: Jun. 30, 1992

[51] Int. Cl.⁶ .............................................. H04N 5/225
[52] U.S. Cl. ...................................... 348/61; 348/231; 348/203
[58] Field of Search ............... 358/209, 206, 332, 108, 358/105, 213.11, 199; 348/61, 203, 231

[56] References Cited

U.S. PATENT DOCUMENTS

| | | | |
|---|---|---|---|
| 3,809,806 | 5/1974 | Walker et al. | 178/7.6 |
| 3,885,090 | 5/1975 | Rosenbaum | 358/105 |
| 3,956,586 | 5/1976 | Ullstig | 178/7.6 |
| 4,008,371 | 2/1977 | Barron | 358/206 |
| 4,054,752 | 10/1977 | Dennis, Jr. et al. | 358/108 |
| 4,176,907 | 12/1979 | Matsumoto | 358/199 |
| 4,274,703 | 6/1981 | Fisli | 358/199 |
| 4,281,354 | 7/1981 | Conte | 358/108 |
| 4,393,408 | 7/1983 | Beck et al. | 358/205 |
| 4,574,197 | 3/1986 | Kliever | 358/206 |
| 4,589,030 | 5/1986 | Kley | 358/225 |
| 4,811,037 | 3/1989 | Avai | 346/108 |
| 5,055,935 | 10/1991 | Ohno | 358/296 |

FOREIGN PATENT DOCUMENTS 2219330 4/1992 Germany ........................... 358/108

Primary Examiner—Joseph Mancuso
Assistant Examiner—Wendy R. Greening
Attorney, Agent, or Firm—Robbins, Berliner & Carson

[57] ABSTRACT

The present invention provides a system for recording images occurring both before and after a triggering event. Temporarily stored images are continually refreshed, the most recent images replacing the oldest images, providing a continuously updated history of recent events in a memory configured as an endless loop. Upon receipt of an external trigger, a predetermined further quantity of temporary images are stored until the capacity of the temporary storage medium is reached and then all temporarily stored images are then permanently stored. The system includes a rotating polygon mirror which produces a sequence of image scan lines. A lens system focuses the scan lines onto a linear array of photodetectors. Transient digitizers or a CCD linear storage array temporarily stores image data received from the photodetectors. Upon receipt of a trigger, the temporarily stored images are transferred to permanent digital memory after a predetermined further quantity of images have been stored.

20 Claims, 2 Drawing Sheets

HIGH SPEED DIGITAL FRAMING CAMERA

BACKGROUND OF THE INVENTION

ORIGIN OF THE INVENTION

The invention described herein was made in the performance of work under a National Science Foundation Grant.

FIELD OF THE INVENTION

The present invention relates generally to the field of high speed motion camera systems and in particular to a system for permanently recording monitored images upon receipt of an external trigger.

DESCRIPTION OF THE PRIOR ART

High speed motion camera systems including film, video tape and digital systems are presently known. Some high speed film cameras use a rotating mirror to make a sequence of images on film. High speed video cameras record directly on magnetic tape. Digital cameras normally utilize 2-dimensional pixel detector arrays and a magnetic recording medium to capture high speed events.

A problem associated with such camera systems is the amount of recording medium expended in order to capture a high speed random event. Presently a field of view must be continually recorded in order to capture the desired event and any associated preceding data, such as the cause of the event. Continuous high speed recording requires significant quantities of the recording medium and is therefore a relatively expensive way to capture random events. Digital camera systems are also often limited by the relatively long time required to read the recorded data out of the 2-dimensional array as well as the practical limitations of available memory.

What is needed is a recording system which is able to record and store high speed random events without requiring the utilization of large amounts of recording medium or, in the case of digital camera systems, a lengthy process to read the detected data out of the 2-dimensional array.

SUMMARY OF THE INVENTION

The present invention provides a high speed electronic camera utilizing an array of solid state detectors. A plurality of scan lines of images are superimposed on the array by a rotating optical element, such as a polygonal mirror. The output of the detectors are digitized and temporarily stored in a fixed capacity memory. CCD detectors may be used as transient digitizers for temporary storage and speed of digitization. The temporary storage is arranged in an endless loop fashion, that is, when the memory capacity is filled, the next data to be stored is written over the earliest data stored. Upon receipt of an external trigger, a predetermined number of subsequent detector outputs are stored and then all the temporarily stored data are transferred to a permanent storage device.

In a first aspect, the present invention provides a digital framing camera including means for converting images into sequences of scan lines, means for detecting the scan lines, means having a fixed capacity for temporarily storing a quantity of the detected scan lines, trigger means for temporarily storing a predetermined further quantity of the detected scan lines, and means responsive to the trigger means for permanently storing the quantity of temporarily stored detected scan lines.

In another aspect, the present invention provides an optoelectronic scanning system for recording images including an optical element driven in rotation to produce a sequence of image scan lines, a detection system having an array of optical detectors, an optical element for focusing the image scan lines on the detection system, a digital system in communication with the detection system for temporary storage of a sequence of image scan lines, and a memory system in communication with the detection system and responsive to a trigger for temporarily storing a predetermined further quantity of image scan lines.

In another aspect, the present invention provides a method of detecting and storing random high speed events by converting images into sequences of scan lines, detecting the scan lines, temporarily storing a quantity of the detected scan lines, detecting a trigger signal for temporarily storing a predetermined further quantity of the detected scan lines, and then permanently storing the quantity of temporarily stored detected scan lines. The images may conveniently be converted into sequences of scan lines by reflecting the images with a rotating polygon mirror to form scan lines and focussing the scan lines into an image plane detected with a linear array of photodetectors placed in the image plane.

These and other features and advantages of this invention will become further apparent from the detailed description that follows, which is accompanied by several drawing figures. In the figures and description, numerals indicate the various features of the invention, like numerals referring to like features throughout both the drawings and the description.

DETAILED DESCRIPTION OF THE PREFERRED EMBODIMENT

The present invention provides a high speed digital framing camera system for making motion pictures at very high framing rates, such as 20,000 frames per second. Images within a field of view of the camera are digitized and temporarily stored on an ongoing basis in a fixed capacity memory arranged in an endless loop fashion. That is, the temporarily stored images are continually refreshed, with the most recent images replacing the oldest images, providing a continuously updated history of recent images within the field of view. In other words, when the fixed capacity of the temporary memory storage is filled, the old data is overwritten by the next data to be stored.

Upon receipt of an external trigger, the data storage is continued for a predetermined number of data bytes and then all the temporarily stored images are transferred to a permanent storage medium. The predetermined number of data bytes may, for example, be one half of the total data that may be stored in the temporary storage so that half the permanently recorded data occurred before and half after the trigger.

In such an arrangement, upon receipt of a trigger, recording or storage would continue until one half of the temporary storage was filled with additional data and then the entire contents of the temporary storage would be transferred to permanent storage. In this way, additional real time images within the field of view after the trigger may also be permanently stored providing a recording of events occurring both before and after the triggering event. The predetermined number of data bytes to be stored depends upon the application for which the camera system is being used.

The camera system thus permits the high speed recording of a random event without requiring advance knowledge of when the event will occur. The preceding cause of an event may thereby be recorded even when the camera system is triggerable only by the occurrence of the event.

Figure 1:
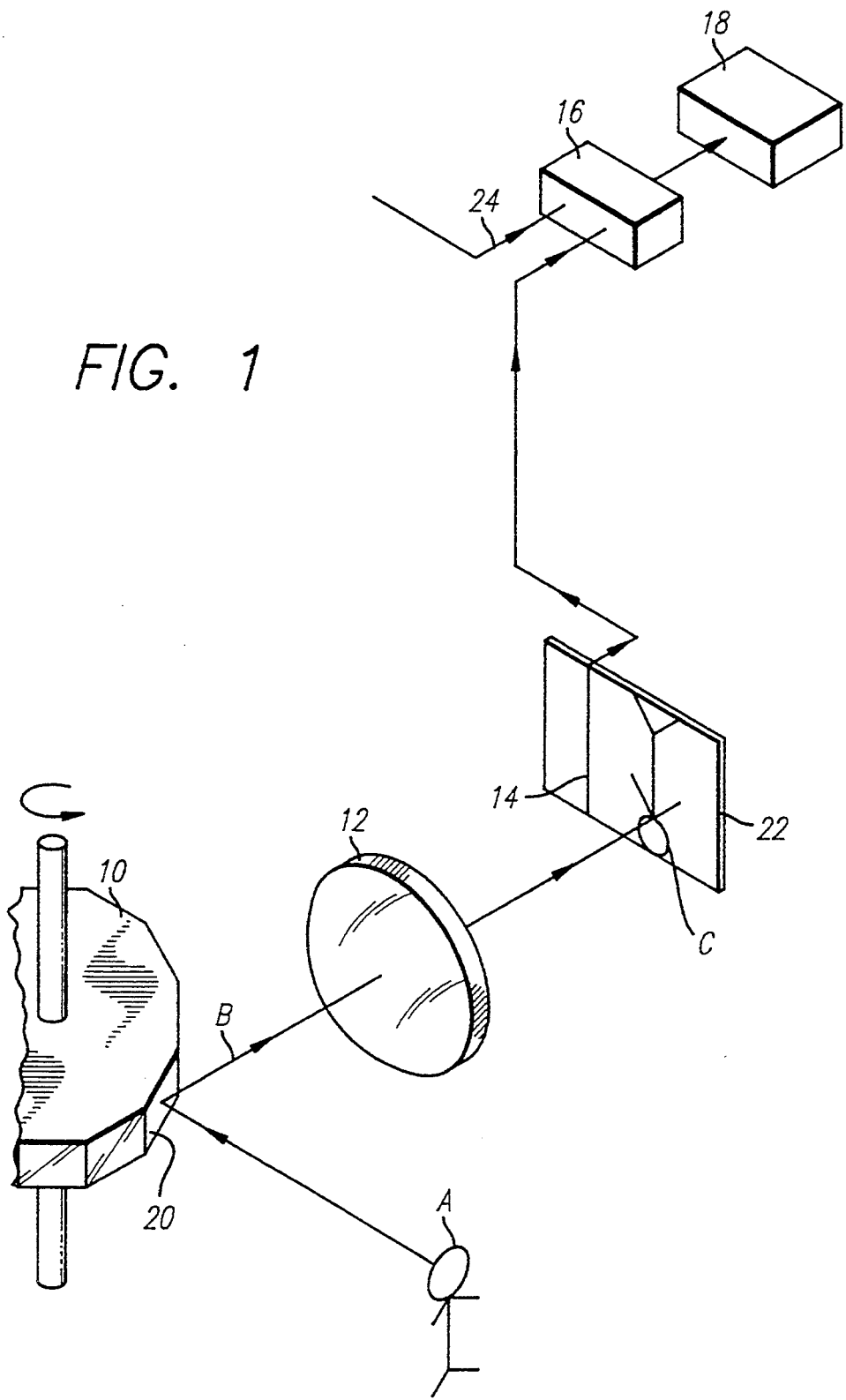
FIG. 1 is schematic view of a digital framing camera embodying principles of the current invention.

As generally shown in FIG. 1 the camera system provides rotating optical element focusing optical element 12, optical detector array 14, temporary storage system 16, and permanent storage system 18.

Rotating optical element 10 may be a polygonal mirror or other device which converts an image of object A into a series of scan lines directed towards focusing optical element Focusing optical element 12 is a lens system which receives the scan lines, such as scan line B from reflecting surface 20 of rotating optical element 10, and focuses the scan lines into image plane 22 forming a series of moving images C. For example, if rotating optical element 10 has N facets and rotates at f cycles per second, it will horizontally sweep fN images per second of object A across image plane 22.

Optical detector array 14 is placed within image plane 22. Optical detector array 14 may be an array of photocells or other optoelectronic light sensitive devices and is preferably a linear array arranged perpendicular to the movement of image C. The movement of rotating optical element 10 causes image C to be repetitively horizontally swept over optical detector array 14.

The output of optical detector array 14 goes to temporary storage system 16. Temporary storage system 16 is an array of digital recording devices such as transient digitizers or CCD linear storage devices. Each photocell of optical detector array 14 is connected to one storage channel within temporary storage system 16. Thus, a sequence of horizontal lines of image C is recorded by each storage device of temporary storage system 16.

Figure 2:
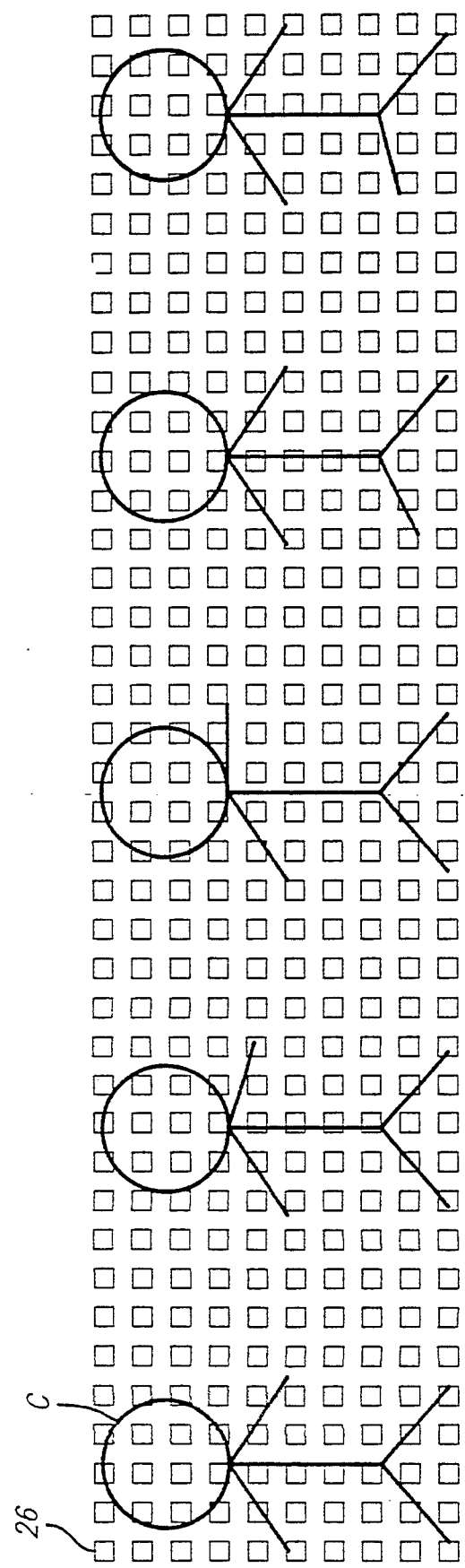
FIG. 2 is a pictorial representation of how images are stored in digital memory.

Referring to FIG. 2, a memory map is shown indicating the way sequences of image C are digitally stored. Each pixel 26 represents a byte of memory in a storage channel of temporary storage system 16. Ten storage channels are vertically represented. Each horizontal row of pixels 26 represents the memory locations of one of the storage channels. Every eight pixels 26 to the right, beginning from the left edge of the memory map, constitutes an image frame.

Upon the occurrence of external trigger 24, control circuitry in system 16 continues recording for a predetermined number of bytes of data and then the data stored in temporary storage system 16 is transferred to permanent storage system 18. In this way, data stored both before the occurrence of the external trigger, together with a fixed amount of data occurring after the trigger, are recorded as incoming images from optical detector array 14. Permanent storage system 18 may be any convenient digital recording system, such as an electronic digital memory with dedicated control logic or a computer system.

In a presently preferred embodiment, optical detector array 14 has 32 photodetectors connected to 32 channels of transient digitizers within temporary storage system 16. Each transient digitizer channel has 32,000 bytes of memory. The digitization rate is 10 Megahertz. Rotating optical element 10 is set to cause 100,000 images C per second to sweep across optical detector array 14 so that each image sweep will fill 100 bytes of memory of each transient digitizer. After transfer to the memory of permanent storage system 18, the data from each digitizer channel corresponds to a vertical coordinate of image C. Memory location (modulo 100) corresponds to horizontal positions of image C and each successive 100 bytes of memory corresponds to a new frame of image C. This embodiment will digitize 320 frames, each 32 pixels high by 100 pixels wide, at the rate of 100,000 frames per second.

Having now described the invention in accordance with the requirements of the patent statutes, those skilled in this art will have no difficulties making changes and modifications in the embodiment of the individual elements of the invention in order to meet their specific requirements or conditions. Such changes and modifications may be made with out departing from the scope and spirit of the invention as set forth in the following claims.

What is claimed is:

1. A digital framing camera comprising:
   means for scanning an image in a horizontal direction;
   a single linear array of photodetectors for receiving said image by receiving a series or vertical segments of said image in sequence, each of said vertical segments being a different portion of the image scanned by the scanning means;
   storage means having a fixed capacity for temporarily storing a first quantity of the vertical segments;
   first means responsive to a trigger signal for temporarily storing a predetermined further second quantity of the vertical segments into the storage means; and
   second means responsive to the trigger signal for permanently storing the first and second quantities of vertical segments stored in the storage means.

2. The digital framing camera of claim 1 wherein the second means further comprises:
   third means for permanently storing the first and second quantities of vertical segments after the second quantity of vertical segments have been stored in response to the trigger signal.

3. The digital framing camera of claim 1 wherein the scanning means comprises a rotating polygon mirror.

4. The digital framing camera of claim 1 wherein the receiving means comprises:
   a lens system which focuses output from the scanning means onto an image plane; and
   a linear array of photodetectors placed in the image plane.

5. The digital framing camera of claim 4 wherein the storage means further comprises a transient digitizer in communication with each photodetector.

6. The digital framing camera of claim 4 wherein the storage means comprises a CCD linear storage array in communication with the linear array of photodetectors.

7. The digital framing camera of claim 1 wherein the storage means further comprises:
   a fixed capacity memory organized in an endless loop fashion.

8. The digital framing camera of claim 1 wherein the second means comprises digital memory and associated control circuitry.

9. The digital framing camera of claim 1 wherein the second means comprises a computer.

10. An optoelectronic scanning system for recording images, comprising:

a scanning optical element driven in rotation for scanning an image in a horizontal direction;

a focusing optical element for focusing linear vertical segments of the image scanned by the scanning optical element, each of said vertical segments being a different portion of said image sequentially scanned by the scanning optical element;

a detection system having a linear array of optical detectors for detecting segments focused by the focusing optical element;

a digital system in communication with the detection system for temporarily storing a first quantity of said segments, said digital system further responsive to a trigger signal for temporarily storing a predetermined second quantity of segments so that said digital system includes the first quantity stored before said trigger signal as well as the second quantity stored thereafter.

11. The system of claim 10, wherein the digital system further comprises:

means for permanently storing the first and second quantities of vertical segments.

12. The system of claim 10 wherein the optical element driven in rotation comprises a rotating polygon mirror.

13. The system of claim 10 wherein the optical element for focusing the vertical segments comprises a lens system which focuses the vertical segments into an image plane.

14. The system of claim 10 wherein the detection system comprises a linear array of photodetectors placed in the image plane.

15. The system of claim 10 wherein the digital system comprises a transient digitizer in communication with each optical detector in the linear array of optical detectors.

16. The system of claim 10 wherein the digital system comprises a CCD linear storage array in communication with the linear optical detectors.

17. The system of claim 11 wherein the means for permanently storing the vertical segments further comprises a digital memory array and associated control circuitry.

18. A method of detecting and storing random high speed events, comprising the steps of:

scanning an image;

detecting lines of the image sequentially by a single linear array of photodetectors, each line being a different portion of the image scanned in the scanning step;

temporarily storing a quantity of the detected lines;

detecting a trigger signal for temporarily storing a predetermined further quantity of the detected lines; and then permanently storing the quantity of temporarily stored detected lines.

19. The method of claim 18 wherein the scanning step comprises the steps of:

reflecting the images with a rotating polygon mirror; and focussing reflection from the mirror onto an image plane.

20. The method of claim 19 wherein the step of detecting the scan lines further comprises the step of:

detecting the scan lines with a linear array of photodetectors placed in the image plane.

* * * * *